United States Patent
Budde et al.

(10) Patent No.: US 11,817,738 B2
(45) Date of Patent: Nov. 14, 2023

(54) FAULT CONDITION DETECTION SYSTEM AND METHOD

(71) Applicant: SCHNEIDER ELECTRIC IT CORPORATION, Foxboro, MA (US)

(72) Inventors: Kristian Budde, Kolding (DK); Jesper Hougaard Johansen, Vejen (DK); Jacob Gregers Hansen, Kolding (DK)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 17/479,227

(22) Filed: Sep. 20, 2021

(65) Prior Publication Data

US 2022/0109322 A1    Apr. 7, 2022

Related U.S. Application Data

(63) Continuation of application No. 16/815,094, filed on Mar. 11, 2020, now Pat. No. 11,128,164.

(51) Int. Cl.
*H02J 9/06* (2006.01)
*H02J 1/10* (2006.01)
*H02M 3/158* (2006.01)

(52) U.S. Cl.
CPC .............. *H02J 9/061* (2013.01); *H02J 1/108* (2013.01); *H02M 3/158* (2013.01)

(58) Field of Classification Search
CPC ......... H02J 9/061; H02J 11/108; H02M 3/158
See application file for complete search history.

(56) References Cited

U.S. PATENT DOCUMENTS

| 10,340,732 | B2 | 7/2019 | Bach | |
| 2008/0252144 | A1* | 10/2008 | Wang | H02J 9/062 307/66 |

(Continued)

FOREIGN PATENT DOCUMENTS

| CN | 103904726 A | 7/2014 |
| CN | 104704706 A | 6/2015 |

(Continued)

OTHER PUBLICATIONS

Extended European Search Report from corresponding European Application No. 21161335.1 dated Jul. 29, 2021.

*Primary Examiner* — Jared Fureman
*Assistant Examiner* — Esayas G Yeshaw
(74) *Attorney, Agent, or Firm* — Lando & Anastasi, LLP

(57) ABSTRACT

According to an example, an uninterruptible power supply is provided comprising a first input, a backup input, an output to provide output power, an inverter coupled to the first input, the backup input, and the output, a first sensor to detect a voltage at an inverter output, a second sensor to detect a voltage at the first input, a switch coupled between the first input and the output, and a controller coupled to the switch and the first and second sensors, and configured to determine a first voltage difference across the bypass switch using at least one of the first sensor or the second sensor, filter the first voltage difference, determine whether a value derived from the first filtered voltage difference exceeds a threshold, and output an indication of a failure of the bypass switch based on the value derived from the first filtered voltage difference exceeding the threshold.

20 Claims, 5 Drawing Sheets

(56) References Cited

U.S. PATENT DOCUMENTS

2012/0181871 A1* 7/2012 Johansen ................ H02J 9/062
 307/66
2013/0193761 A1 8/2013 Colombi et al.
2019/0260228 A1* 8/2019 Patel ....................... H02J 9/061

FOREIGN PATENT DOCUMENTS

| CN | 108372789 A | 8/2018 |
| EP | 1903651 A1 | 3/2008 |
| GB | 2224895 A | 5/1990 |

* cited by examiner

FAULT CONDITION DETECTION SYSTEM AND METHOD

CROSS-REFERENCE TO RELATED APPLICATIONS

This application claims priority under 35 U.S.C. § 120 as a continuation of U.S. application Ser. No. 16/815,094 [now U.S. Pat. No. 11,128,164], titled "FAULT CONDITION DETECTION SYSTEM AND METHOD," filed on Mar. 11, 2020, which is hereby incorporated by reference in its entirety.

BACKGROUND

1. Field of the Disclosure

At least one example in accordance with the present disclosure relates generally to monitoring electronic devices.

2. Discussion of Related Art

The use of power devices, such as uninterruptible power supplies (UPSs), to provide regulated, uninterrupted power for sensitive and/or critical loads, such as computer systems and other data processing systems, is known. Known UPSs include online UPSs, offline UPSs, line-interactive UPSs, as well as others. Online UPSs provide conditioned AC power as well as back-up AC power upon interruption of a primary source of AC power.

SUMMARY

According to at least one aspect of the present disclosure, an uninterruptible power supply is provided comprising a first input configured to receive input power, a backup input configured to receive backup power from a backup power source, an output configured to provide output power to a load derived from at least one of the input power or the backup power, an inverter coupled to the first input, the backup input, and the output, a first sensor configured to detect a voltage at an output of the inverter, a second sensor configured to detect a voltage at the first input, a bypass switch coupled between the first input and the output, and a controller coupled to the bypass switch, the first sensor, and the second sensor and configured to determine a first voltage difference across the bypass switch using at least one of the first sensor or the second sensor, apply a high pass filter to the first voltage difference to obtain a first filtered voltage difference, determine whether a value derived from the first filtered voltage difference exceeds a threshold, and output an indication of a failure of the bypass switch based on the value derived from the first filtered voltage difference exceeding the threshold.

In various examples, the controller is further configured to determine an absolute value of the first filtered voltage difference, and sum the absolute value of the first filtered voltage difference with an array of one or more filtered voltage differences to generate the value derived from the first filtered voltage difference, the value derived from the first filtered voltage difference being a first absolute value voltage sum. In at least one example, the controller is further configured to determine that the first absolute value voltage sum does not exceed the threshold, add the first filtered voltage difference to the array of one or more filtered voltage differences, determine a second voltage difference across the bypass switch using at least one of the first sensor or the second sensor, apply the high pass filter to the second voltage difference to obtain a second filtered voltage difference, determine an absolute value of the second filtered voltage difference, sum the absolute value of the second filtered voltage difference with the array of one or more filtered voltage differences to determine a second absolute value voltage sum, determine that the second absolute value voltage sum exceeds the threshold, and output the indication of the failure of the bypass switch based on the second absolute voltage value sum exceeding the threshold.

In some examples, the bypass switch includes at least one silicon-controlled rectifier. In various examples, the bypass switch includes a first silicon-controlled rectifier and a second silicon-controlled rectifier coupled antiparallel to the first silicon-controlled rectifier. In at least one example, the controller is further configured to determine a second voltage difference across the bypass switch using at least one of the first sensor or the second sensor, determine whether the first silicon-controlled rectifier or the second silicon-controlled rectifier is forward-biased based on the second voltage difference, apply the high pass filter to the voltage difference to obtain a second filtered voltage difference, determine whether a value derived from the second filtered voltage difference exceeds the threshold, and output an indication of a failure of one of the first silicon-controlled rectifier or the second silicon-controlled rectifier based on the second filtered voltage difference exceeding the threshold. In some examples, the controller is further configured to control the inverter and the bypass switch to change a mode of operation responsive to determining that the value derived from the first filtered voltage difference exceeds the threshold.

According to some aspects of the disclosure, a non-transitory computer-readable medium storing thereon sequences of computer-executable instructions for controlling a power device having an input configured to be coupled to an AC source and configured to receive AC power from the AC source and an output configured to provide AC power to a load is provided, the power device including an inverter coupled to the input and the output and a bypass switch coupled between the input and the output, the sequences of computer-executable instructions including instructions that instruct at least one processor to determine a first voltage difference across the bypass switch, apply a high pass filter to the first voltage difference to obtain a first filtered voltage difference, determine that a value derived from the first filtered voltage difference exceeds a threshold, and output an indication of a failure of the bypass switch based on the value derived from the first filtered voltage difference exceeding the threshold.

In at least one example, the instructions further instruct the at least one processor to determine an absolute value of the first filtered voltage difference, and sum the absolute value of the first filtered voltage difference with an array of one or more filtered voltage differences to generate the value derived from the first filtered voltage difference, the value derived from the first filtered voltage difference being a first absolute value voltage sum. In various examples, the instructions further instruct the at least one processor to determine that the first absolute value voltage sum does not exceed the threshold, add the absolute value voltage sum to the array of one or more filtered voltage differences, determine a second voltage difference across the bypass switch, apply the high pass filter to the second voltage difference to obtain a second filtered voltage difference, determine an absolute value of the second filtered voltage difference, sum the absolute value of the second filtered voltage difference with the array of one or more filtered voltage differences to determine a second absolute value voltage sum, determine that the second absolute value voltage sum exceeds the threshold, and output the indication of the failure of the bypass switch based on the second absolute voltage value sum exceeding the threshold.

In some examples, the instructions further instruct the at least one processor to control the inverter and the bypass switch to change a mode of operation responsive to determining that the second filtered voltage difference exceeds the threshold. In at least one example, the bypass switch includes a first silicon-controlled rectifier and a second silicon-controlled rectifier coupled antiparallel to the first silicon-controlled rectifier, wherein the power device includes a first sensor coupled to the input and a second sensor coupled to the output, and wherein the instructions further instruct the at least one processor to determine a second voltage difference across the bypass switch using at least one of the first sensor or the second sensor, determine whether the first silicon-controlled rectifier or the second silicon-controlled rectifier is forward-biased based on the second voltage signal, apply the high pass filter to the second voltage difference to obtain a second filtered voltage difference, determine whether a value derived from the second filtered voltage difference exceeds the threshold, and output an indication of a failure of one of the first silicon-controlled rectifier or the second silicon-controlled rectifier based on the second filtered voltage difference exceeding the threshold.

In at least one example, each of the first silicon-controlled rectifier and the second silicon-controlled rectifier includes a respective anode, and wherein in instructing the at least one processor to determine whether the first silicon-controlled rectifier or the second silicon-controlled rectifier is forward-biased based on the second voltage difference, the instructions instruct the at least one processor to determine, based on the second voltage difference, whether a voltage at the anode of the first silicon-controlled rectifier is higher than a voltage at the anode of the second silicon-controlled rectifier, and identify the first silicon-controlled rectifier as forward-biased responsive to determining that the voltage at the anode of the first silicon-controlled rectifier is higher than the voltage at the anode of the second silicon-controlled rectifier.

According to at least one aspect of the disclosure, a power system is provided comprising a first input configured to receive input power, a first output configured to provide output power to a load from the first input, an inverter coupled to the first input and the first output, a first sensor configured to detect a voltage at an output of the inverter, a second sensor configured to detect a voltage at the first input, a bypass switch coupled between the first input and the first output, and a controller coupled to the bypass switch, the first sensor, and the second sensor and configured to determine a first voltage difference across the bypass switch using at least one of the first sensor or the second sensor, apply a high pass filter to the first voltage difference to obtain a first filtered voltage difference, determine that a value derived from the first filtered voltage difference exceeds a threshold, and output an indication of a failure of the bypass switch based on the value derived from the first filtered voltage difference exceeding the threshold.

In at least one example, the controller is further configured to: determine an absolute value of the first filtered voltage difference, and sum the absolute value of the first filtered voltage difference with an array of one or more voltage differences to determine a first absolute value voltage sum. In various examples, the controller is further configured to determine that the first absolute value voltage sum does not exceed the threshold, add the first absolute value voltage sum to the array of one or more voltage differences, determine a second voltage difference across the bypass switch using at least one of the first sensor or the second sensor, apply the high pass filter to the second voltage difference to obtain a second filtered voltage difference, determine an absolute value of the second filtered voltage difference, sum the absolute value of the second filtered voltage difference with the array of one or more voltage differences to determine a second absolute value voltage sum, determine that the second absolute value voltage sum exceeds the threshold, and output the indication of the failure of the bypass switch based on the second absolute voltage value sum exceeding the threshold. In some examples, the bypass switch includes at least one silicon-controlled rectifier.

In various examples, the bypass switch includes a first silicon-controlled rectifier and a second silicon-controlled rectifier coupled antiparallel to the first silicon-controlled rectifier. In at least one example, the controller is further configured to determine a second voltage difference across the bypass switch using at least one of the first sensor or the second sensor, determine whether the first silicon-controlled rectifier or the second silicon-controlled rectifier is forward-biased based on the voltage signal, apply the high pass filter to the second voltage difference to obtain a second filtered voltage difference, determine whether a value derived from the second filtered voltage difference exceeds the threshold, and output an indication of a failure of one of the first silicon-controlled rectifier or the second silicon-controlled rectifier based on the second filtered voltage difference exceeding the threshold. In some examples, the controller is further configured to control the inverter and the bypass switch to change a mode of operation responsive to determining that the first filtered voltage difference exceeds the threshold.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
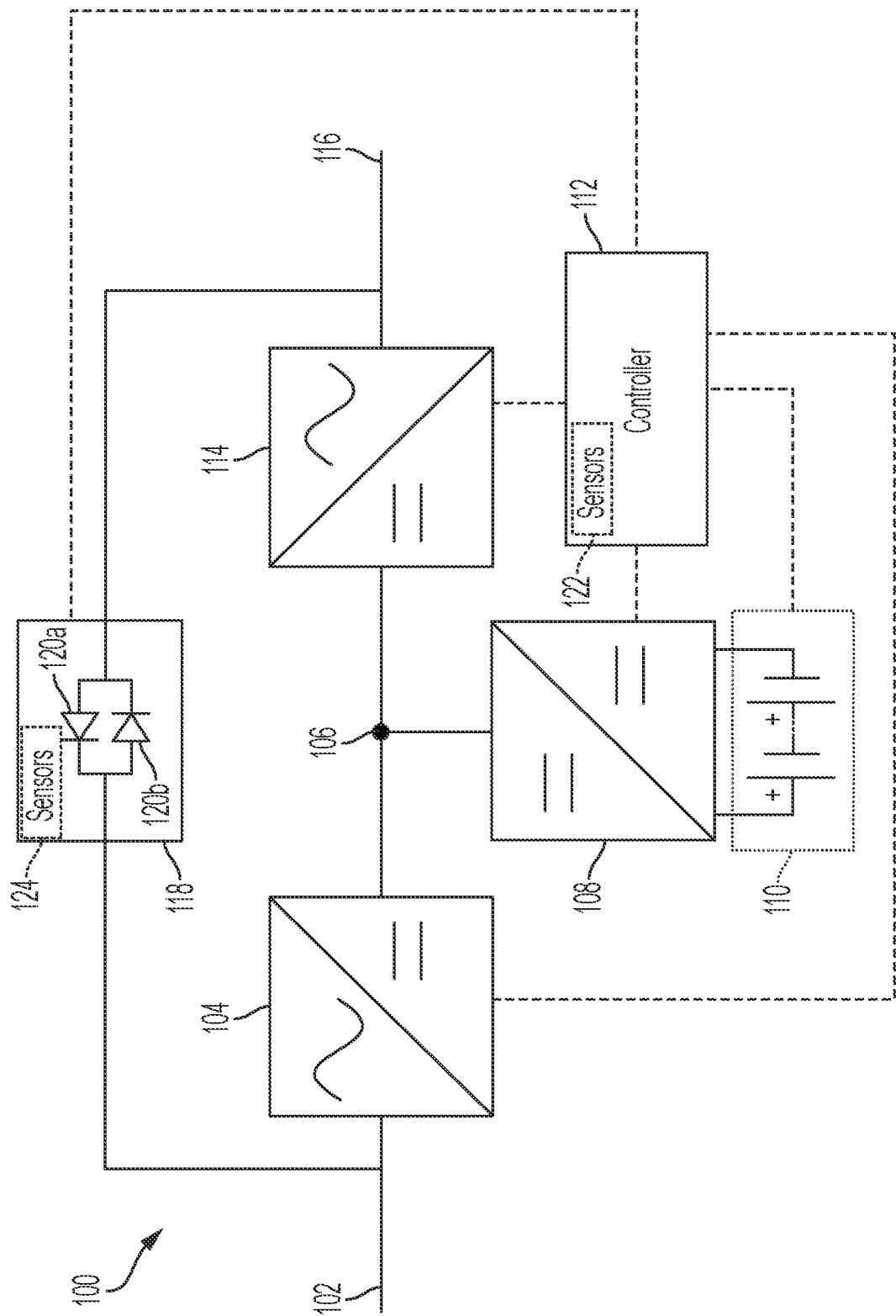
FIG. 1 illustrates a block diagram of an uninterruptible power supply (UPS) according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, certain systems may include uninterruptible power supplies (UPSs) configured to provide regulated, uninterrupted power to one or more loads. UPSs may operate in one of several modes of operation. As discussed in greater detail below, some UPSs may operate in a hybrid mode in which power is provided to a UPS output to a load via at least two paths substantially simultaneously. In a first path, power is efficiently provided with minimal losses from an input source to an output via a bypass switch that bypasses power conditioning circuitry including a rectifier, an energy storage device, and an inverter. In a second path, power is provided through the power conditioning circuitry via the inverter to provide power factor correction for loads coupled to the UPS.

The bypass switch may include two silicon-controlled rectifiers (SCRs) coupled in an antiparallel arrangement with one another. If one or both of the SCRs experiences a fault condition such that the SCR(s) is no longer able to operate in an intended manner, performance of the UPS may be negatively impacted. For example, if the UPS is operating in the hybrid mode but one or both of the SCRs is not operating properly, additional power may be provided from the second path (that is, via the power conditioning circuitry) to compensate for the deficiency or lack of power provided from the first path via the bypass switch. Accordingly, it may be advantageous to identify a fault condition of one or more SCRs such that power inefficiencies may be detected and corrected.

In various examples, identifying a fault condition of one or more SCRs is performed by comparing harmonic signal levels at an input of the one or more SCRs to harmonic signal levels at an output of the one or more SCRs. If the one or more SCRs are operating as intended (that is, not experiencing a fault condition), then harmonics present at an input will generally be present at an output, because power containing the harmonics is conducted through the one or more SCRs from the input to the output. Conversely, if the one or more SCRs experience a fault and are not conducting properly, harmonics present at an input may not be present at an output, and vice versa, because power in which the harmonics are present is not conducted through the one or more SCRs. Accordingly, a fault condition in one or more SCRs may be detected at least in part by analyzing a difference in harmonics at an input and output of the one or more SCRs. If a difference between the input and output harmonics is sufficiently large, then an SCR fault condition may be detected.

According to at least one example, one or more SCRs are monitored for a fault condition. A voltage signal at an input of the one or more SCRs and a voltage signal at an output of the one or more SCRs are detected, and a difference between the voltage signals is determined. A high pass filter is applied to the difference between the voltage signals to isolate higher-order harmonics in the voltage signals. An absolute value of the filtered signal is determined. Samples of the absolute value of the filtered signal are summed over a period of time. A determination is made as to whether the summation meets a criterion (for example, reaching a threshold value) within the period of time. If the summation meets the criterion, then a fault condition is detected. Responsive to detecting the fault condition, one or more actions (for example, changing a mode of operation of a UPS in which the SCR[s] is implemented, such as from the hybrid mode to an online double conversion mode) may be executed. Otherwise, if the summation does not meet the criterion, then no fault condition is detected. A process of monitoring for a fault condition may be thereafter repeated.

FIG. 1 is a block diagram of a UPS 100. The UPS 100 includes an input 102, an AC/DC converter 104, one or more DC busses 106, a DC/DC converter 108, an energy storage device 110 which may include one or more batteries, a controller 112, a DC/AC inverter 114, an output 116, and a bypass switch 118 including a first SCR 120*a* and a second SCR 120*b* (collectively, "SCRs 120"). The controller 112 may include one or more sensors 122. Similarly, the bypass switch 118 may include one or more sensors 124. For example, the sensors 122, 124 may include one or more voltage, current, and/or power sensors.

The input 102 is coupled to the AC/DC converter 104 and the bypass switch 118, and is configured to be coupled to an AC power source (not illustrated), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and the DC/AC inverter 114. The DC/DC converter 108 is coupled to the one or more DC busses 106 and to the energy storage device 110, and is communicatively coupled to the controller 112. The energy storage device 110 is coupled to the DC/DC converter 108. The DC/AC inverter 114 is coupled to the one or more DC busses 106 and to the output 116, and is communicatively coupled to the controller 112. The output 116 is coupled to the DC/AC inverter 114 and to the bypass switch 118, and is configured to be coupled to an external load (not illustrated). The bypass switch 118 is coupled to the input 102 and the output 116, and is coupled in parallel with the components 104-110 and 114.

The one or more sensors 122 are configured to be coupled to, and sense electrical parameters (for example, a current, voltage, and/or power) of one or more of the components 104, 108, 110, 114, and 118. For example, the one or more sensors 122 may include a first voltage sensor and a second voltage sensor respectively coupled to an input and output of the bypass switch 118. The one or more sensors 124 are configured to be coupled to, and sense electrical parameters (for example, a current, voltage, and/or power) of one or more components or nodes of the bypass switch 118. For example, the one or more sensors 124 may include a first voltage sensor and a second voltage sensor respectively coupled to the input and output of the bypass switch 118.

The input 102 is configured to be coupled to an AC mains power source and to receive input AC power having an input voltage level. The UPS 100 is configured to operate in different modes of operation based at least in part on the input voltage level of the AC power provided to the input 102. More particularly, the controller 112 is configured to control operation of the UPS 100 based at least in part on the input voltage level of the AC power provided to the input 102. When AC power provided to the input 102 is acceptable (for example, by having parameters, such as a voltage level, that meet specified values), the UPS 100 may operate in a hybrid mode of operation. In the hybrid mode of operation, AC power received at the input 102 is provided to both the bypass switch 118 and the AC/DC converter 104.

Power provided by the input 102 to the bypass switch 118 is provided from the bypass switch 118 to the output 116, which may provide the power to a load. More particularly, power is provided to the output 116 via one of the two SCRs 120. For example, the SCRs 120 may be coupled in an antiparallel configuration with one another such that only one of the two SCRs 120 is configured to be forward-biased at any one time. If the SCRs 120 are functioning as intended in the hybrid mode of operation, then during a positive half-cycle of an input voltage waveform received at the input 102, the second SCR 120b is controlled by the controller to be turned on and is forward-biased and conducting and the first SCR 120a is reverse-biased and non-conducting. Conversely, during a negative half-cycle of an input voltage waveform received at the input 102, the first SCR 120a is controlled by the controller to be turned on and is forward-biased and conducting and the second SCR 120b is reverse-biased and non-conducting.

Power provided to the AC/DC converter 104 during the hybrid mode of operation may be used to compensate for harmonics generated by a load in the power provided by the bypass switch 118. More particularly, the AC/DC converter 104 converts the AC power received from the input 102 into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the energy storage device 110 to charge the energy storage device 110. The DC/AC inverter 114 receives DC power from the one or more DC busses 106, converts the DC power into regulated AC power, and provides the regulated AC power to the output 116 in conjunction with the power provided by the bypass switch 118. Power provided by the DC/AC inverter 114 may compensate for harmonics in the power provided by the bypass switch 118.

In various examples, even if AC power provided to the input 102 has an acceptable voltage level (for example, by having parameters, such as a voltage level, that meet specified values), the UPS 100 may operate in a double-conversion mode of operation. In the double-conversion mode of operation, AC power received at the input 102 is provided to the AC/DC converter 104. The bypass switch 118 is off in the double conversion mode of operation. Similar to the hybrid mode of operation, however, the AC/DC converter 104 converts the AC power received from the input 102 into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the energy storage device 110 to charge the energy storage device 110. The DC/AC inverter 114 receives DC power from the one or more DC busses 106, converts the DC power into regulated AC power, and provides the regulated AC power to the output 116. Thus, power provided to the output 116 is provided primarily from the DC/AC inverter 114.

When AC power provided to the input 102 from the AC mains power source is not acceptable (for example, by having parameters, such as a voltage level, that do not meet specified values), the UPS 100 operates in a backup mode of operation. In the backup mode of operation, DC power is discharged from the energy storage device 110 to the DC/DC converter 108. The DC/DC converter 108 converts the received DC power and distributes the DC power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116. In some embodiments, all or a subset of the modes of operation described above may be implemented in addition to one or more alternate modes of operation.

Accordingly, a mode of operation of the UPS 100 may be selected from a list that may include a hybrid mode of operation, a double-conversion mode of operation, a backup mode of operation, and a bypass mode of operation. In the bypass mode of operation all power to the load is provided through the bypass switch. For example, the controller 112 may select a mode of operation based on one or more parameters (including, for example, a voltage level of input power) and control operation of the AC/DC converter 104, the DC/DC converter 108, the DC/AC inverter 114, and the bypass switch 118 based on the selected mode of operation.

In various examples, however, it may be disadvantageous to operate the UPS 100 in a hybrid mode of operation where one or both of the SCRs 120 are experiencing a fault condition. A fault condition may include any condition or state of a respective SCR that negatively impacts performance of the respective SCR. For example, an SCR that is incapable of conducting even when forward-biased may be considered to be experiencing a fault condition. In this example, operation of the UPS 100 may be adversely impacted by the fault condition at least because the bypass switch 118 may be unable to conduct a desired amount of power, thereby requiring the DC/AC inverter 114 to compensate for the decrease in power, which may negatively impact the efficiency of the UPS 100. Accordingly, it may be advantageous to detect a fault condition in one or both of the SCRs 120 such that the fault condition may be addressed to improve performance of the UPS 100.

Figure 2:
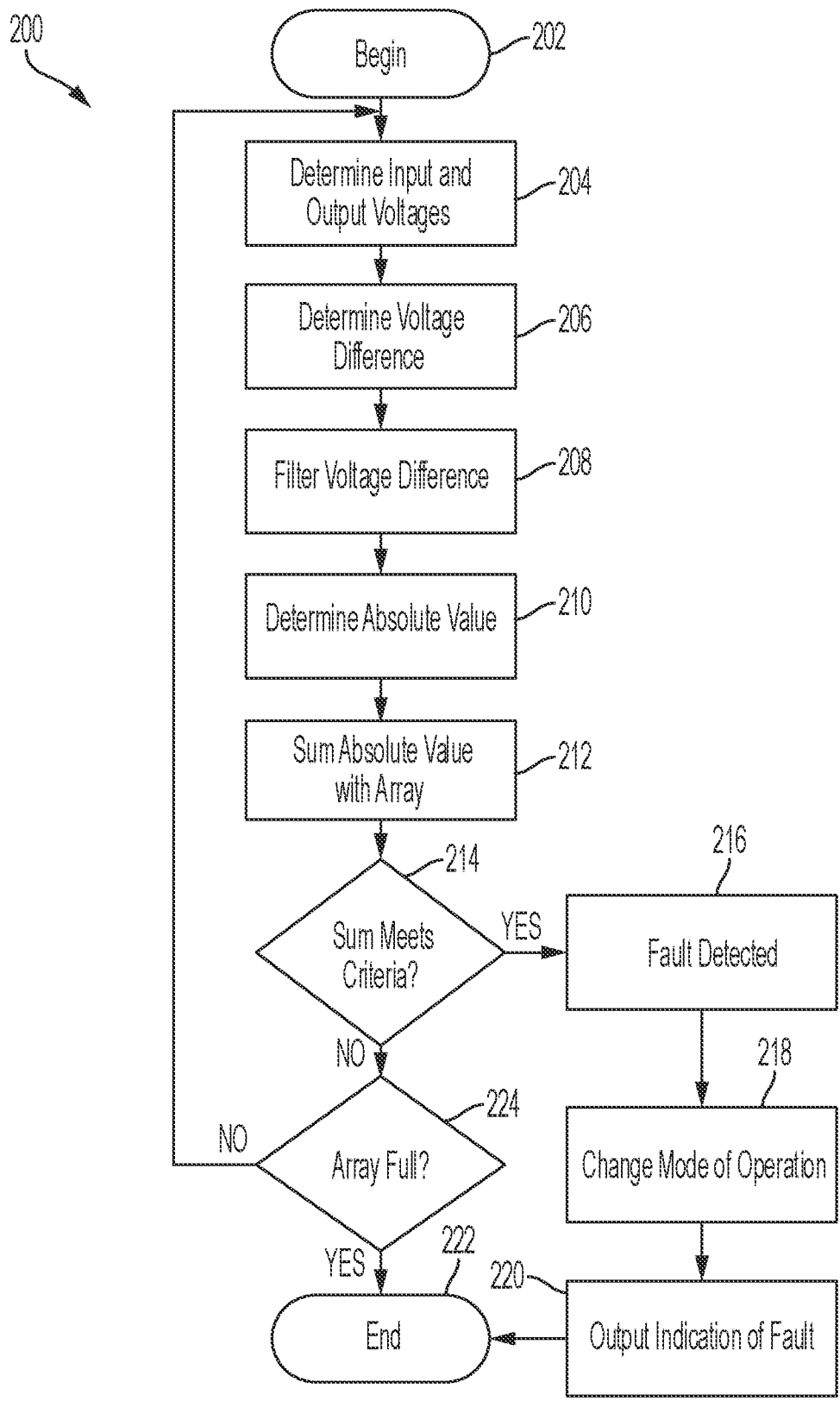
FIG. 2 illustrates a process of controlling the UPS according to an example.

FIG. 2 illustrates a process 200 of operating the UPS 100 according to an example. In various examples, the process 200 may be executed by the controller 112. For example, the process 200 may be executed by the controller 112 during the hybrid mode of operation.

At act 202, the process 200 begins.

At act 204, an input voltage and an output voltage of the bypass switch 118 are detected. The controller 112 may include, or be coupled to, one or more voltage sensors configured to measure a voltage at an input of the bypass switch 118 and a voltage at an output of the bypass switch 118. For example, the controller 112 may include the one or more sensors 122 and may be coupled to the one or more sensors 124. As used herein, an input of the bypass switch 118 may refer to a node at a cathode of the first SCR 120*a* and an anode of the second SCR 120*b*, although in other examples, the input of the bypass switch 118 may refer to a node at an anode of the first SCR 120*a* and a cathode of the second SCR 120*b*. Similarly, an output of the bypass switch 118 may refer to a node at an anode of the first SCR 120*a* and a cathode of the second SCR 120*b*, although in other examples, the output of the bypass switch 118 may refer to a node at a cathode of the first SCR 120*a* and an anode of the second SCR 120*b*, depending on which node is identified as the input of the bypass switch 118. That is, a node is not simultaneously both an input and an output.

Figure 3:
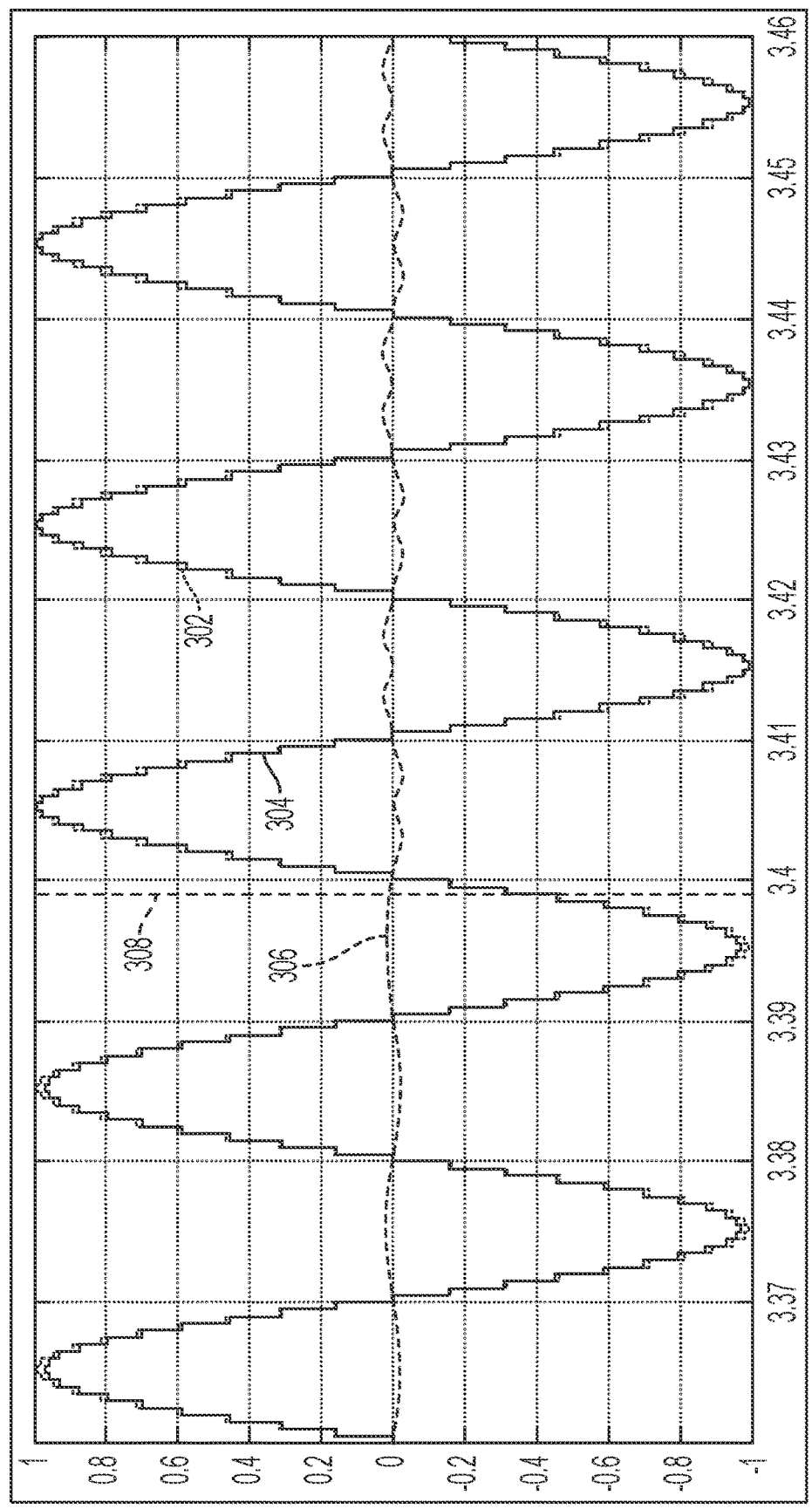
FIG. 3 illustrates a graph of voltage values according to an example.

At act 206, a voltage difference is determined. The controller 112 may determine a difference between the input voltage and the output voltage detected at act 204. For example, FIG. 3 illustrates a graph 300 of voltage values according to an example, the graph 300 including an input voltage trace 302, an output voltage trace 304, and a voltage difference trace 306. While differences between the input voltage trace 302 and the output voltage trace 304 are small and relatively difficult to visually detect, the voltage difference trace 306 illustrates a voltage difference signal between the input voltage trace 302 and the output voltage trace 304. As illustrated by the voltage difference trace 306, a difference between the input voltage and the output voltage over time is roughly sinusoidal having a frequency approximately equal to a grid frequency, approximately 60 Hz, until a first time 308. At the first time 308, at least one of the SCRs 120 experiences a fault condition, and higher-order harmonics that would normally pass through the at least one of the SCRs 120 and cancel out by execution of the voltage difference operation become present in the voltage difference trace 306.

Figure 4:
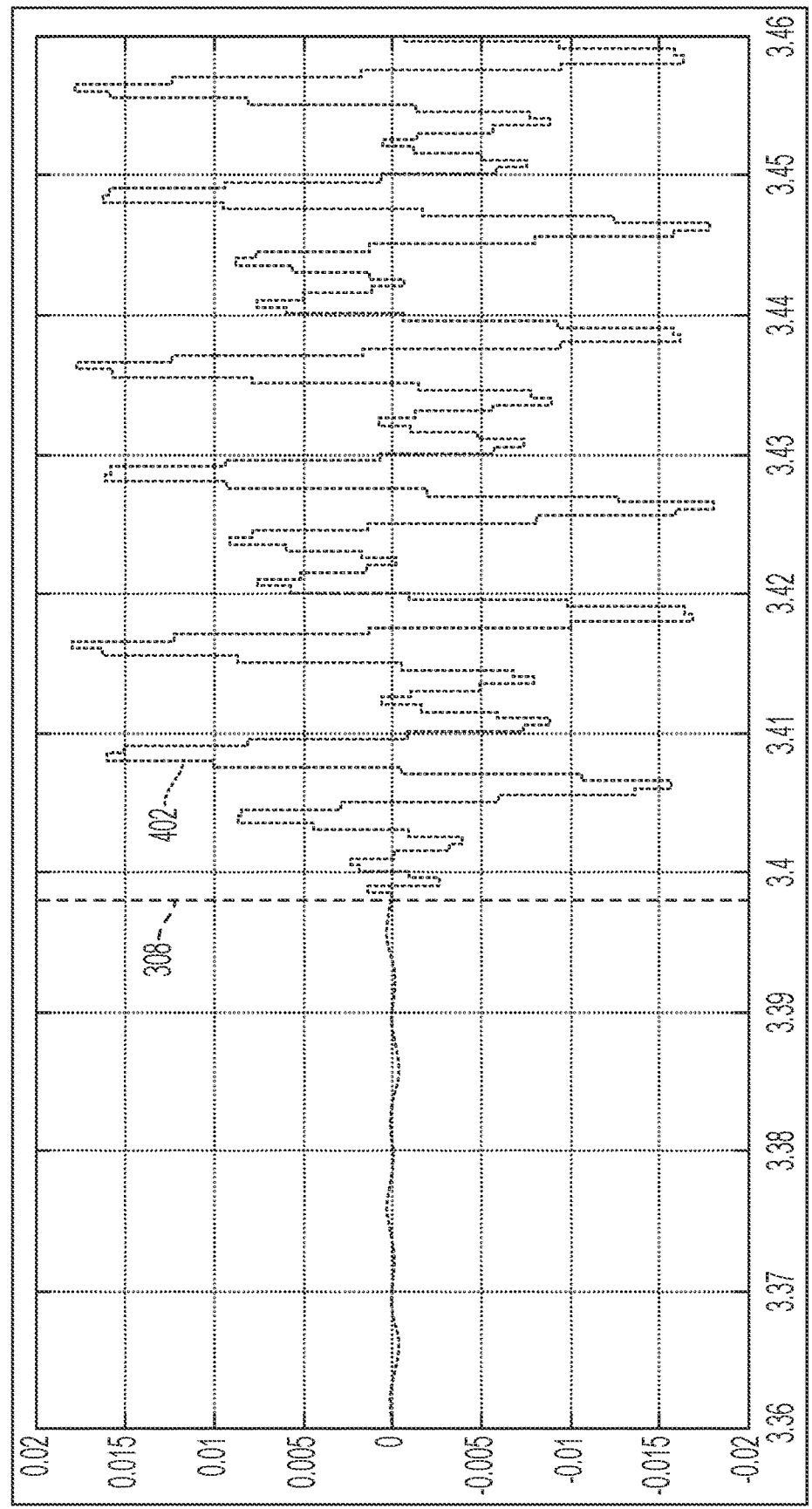
FIG. 4 illustrates a graph of a filtered voltage according to an example.

At act 208, the voltage difference is filtered to determine a filtered voltage difference. For example, the controller 112 may execute a high-pass filtering technique on the voltage difference determined at act 206. More particularly, the high-pass filtering technique may filter signals below a threshold frequency selected to isolate higher-order harmonics. The threshold frequency may be twice a grid frequency. For example, where the grid frequency is 60 Hz, as discussed above with respect to FIG. 3, the threshold frequency may be 120 Hz. FIG. 4 illustrates a graph 400 of a filtered voltage signal according to an example, the graph 400 including a filtered voltage signal trace 402. The filtered voltage signal trace 402 is comprised of several data points, each representing a filtered voltage difference determined at a respective time. As discussed above with respect to FIG. 3, at least one of the SCRs 120 experiences a fault condition at the first time 308, after which higher-order harmonics are more substantially present in the voltage difference across the at least one of the SCRs 120.

At act 210, an absolute value of the filtered voltage difference is determined. Determining the absolute value of the filtered voltage difference includes determining a magnitude of the filtered voltage difference.

At act 212, the absolute value of the filtered voltage difference is added to an array and summed over time to generate a value derived from the filtered voltage difference, also referred to herein as an absolute value voltage sum. The array includes several elements, each element being an absolute value of a filtered voltage difference determined at a respective point in time. As each absolute value of a respective filtered voltage difference is determined, the absolute value is added to, and summed with, the other elements in the array. As discussed above, the absolute value of a respective filtered voltage difference may be larger where higher-order harmonics are present. For example, extrema of the filtered voltage signal trace 402 after the first time 308 are generally larger than extrema of the filtered voltage signal trace 402 before the first time 308. Thus, the absolute value of the filtered voltage differences, and consequently the summation of the array, may be relatively small before the first time 308 (that is, before the at least one of the SCRs 120 is experiencing a fault condition), and may be relatively large after the first time 308.

Figure 5:
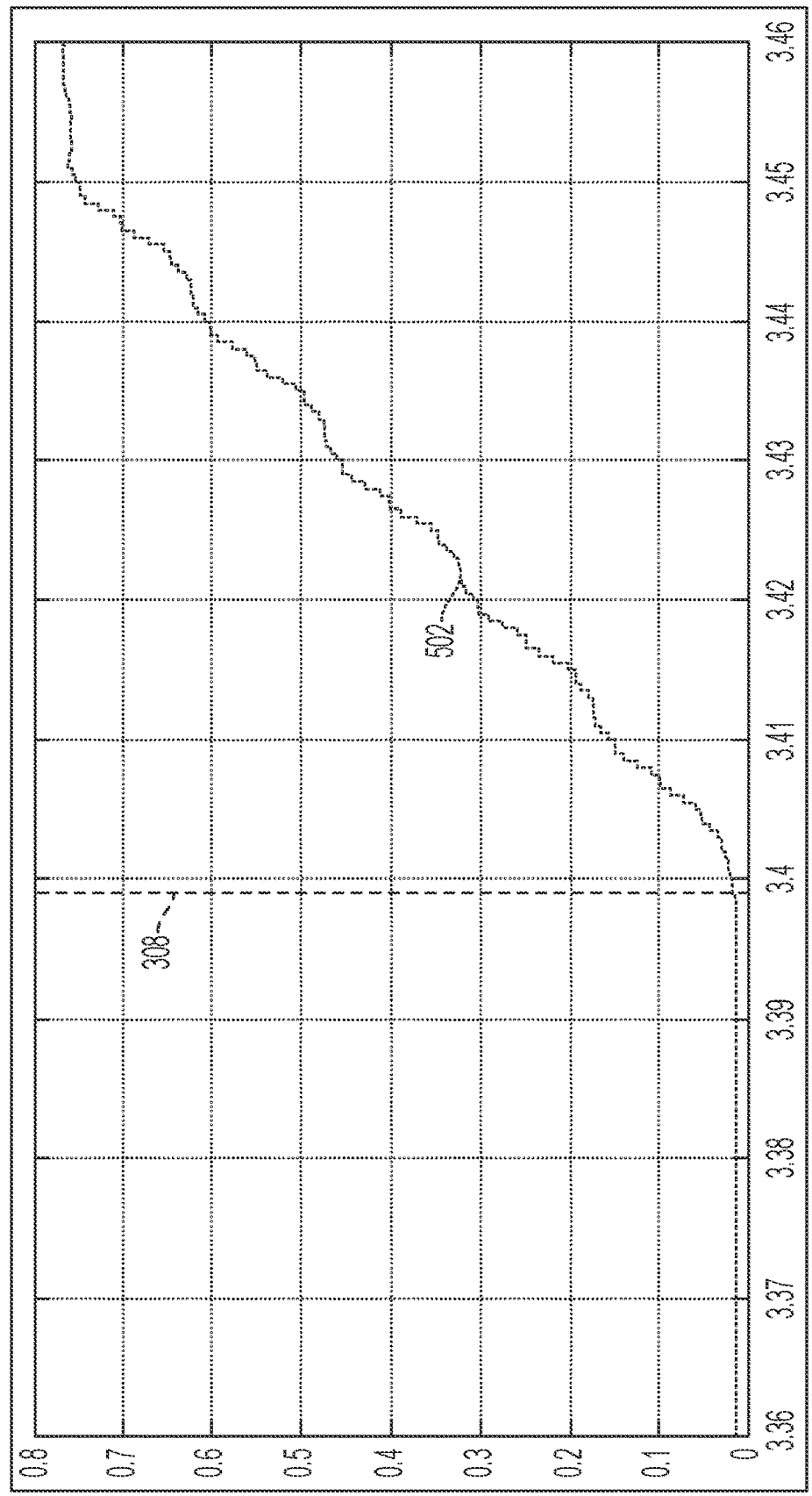
FIG. 5 illustrates a graph of a filtered voltage summation according to an example.

For example, FIG. 5 illustrates a graph 500 of a filtered voltage summation according to an example, the graph 500 including a filtered voltage summation trace 502. The filtered voltage summation trace 502 indicates a sum of the array discussed above over time. As indicated by the filtered voltage trace 502, the summation value increases rapidly after the first time 308 as the at least one of the SCRs 120 experiences a fault condition and harmonics are more significantly present in the voltage difference.

At act 214, a determination is made as to whether the summation (i.e., the value derived from the filtered voltage difference) meets fault detection criteria. For example, the fault detection criteria may include a threshold value above which a fault condition is determined to have occurred. The threshold value may be selected such that the summation exceeds the threshold where the at least one of the SCRs 120 that is intended to be operating in a closed and conducting mode of operation experiences a fault condition and thereby yields higher-order harmonics in the voltage difference. Similarly, the threshold value may also be selected such that the summation does not exceed the threshold where the at least one of the SCRs 120 is not experiencing a fault condition, thereby causing higher-order harmonics to be cancelled out in the voltage difference. If a determination is made that the summation meets the fault detection criteria (214 YES), then the process 200 continues to act 216.

At act 216, a fault condition is detected. As discussed above, the fault condition may be determined to have occurred based on the imbalance in higher-order harmonics between an input and output of the at least one of the SCRs 120. The at least one of the SCRs 120 may therefore be identified as experiencing a fault condition at least because the at least one of the SCRs 120 is not conducting properly, as evidenced by the imbalance in higher-order harmonics across the at least one of the SCRs 120.

Identifying the fault condition may include determining which of the SCRs 120 is experiencing a fault condition. Because only one of the SCRs 120 may be forward-biased at any one time, a determination may be made as to which of the SCRs 120 is supposed to be conducting when the fault condition is detected, but which is not so conducting as evidenced by the fault condition being detected. For example, the controller 112 may be configured to control the respective states of the SCRs 120*a*, 120*b*, and may thus already have information indicative of the modes of operation of the SCRs 120*a*, 120*b* readily accessible. In one example, determining which of the SCRs 120*a*, 120*b* is supposed to be conducting includes determining which of the SCRs 120*a*, 120*b* has a higher anode voltage, and identifying that SCR as being forward-biased. Thus, identifying the fault condition may more particularly include determining whether the first SCR 120a or the second SCR 120b is experiencing the fault condition.

At act 218, a mode of operation of the UPS 100 is changed responsive to detecting the fault condition. Because at least one of the SCRs 120 is not operating properly, the hybrid mode of operation may not operate at a desired level of efficiency. Accordingly, a mode of operation of the UPS 100 may be changed from the hybrid mode to another mode of operation, such as the double-conversion mode of operation, the backup mode of operation, or another mode of operation.

At act 220, an indication of the fault condition is output. For example, act 222 may include communicating one or more signals via a wired or wireless connection to one or more internal or external devices. Internal devices may include, for example, displays coupled to the UPS 100 to provide information to one or more operators of the UPS 100. External devices may include, for example, one or more user devices, such as computers, laptops, tablets, cellular phones, and so forth, to provide information to one or more operators of the UPS 100. Parties receiving the information may subsequently act on the indication, such as by replacing the SCR(s) that has been identified as experiencing the fault condition.

At act 222, the process 200 ends.

Returning to act 214, if a determination is made that the summation does not meet the criteria (214 NO), then the process 200 continues to act 224. At act 224, a determination is made as to whether the array in which the voltage values are stored is full. Because even very small voltage difference values identified prior to a fault condition occurring may eventually sum to a large value sufficient to meet the fault detection criteria, the array has a finite size selected such that the array is unlikely to include enough very small voltage difference values to meet the fault detection criteria. If the array is full (224 YES), then the process 200 ends at act 222. Otherwise, if the array is not full (224 NO), then the process 200 returns to act 204, and acts 204-214 and 224 are repeated until either the summation meets the criteria (214 YES) or the array is filled (224 YES).

In various examples, a delay may be implemented after determining that the array is not full (224 NO). For example, the UPS 100 may be configured to execute acts 204-214 at a frequency of approximately 2 kHz, and a delay may be implemented after determining that the array is not full (224 NO) such that the 2 kHz sampling frequency is achieved. In other examples, any other desired frequency may be achieved through the implementation of delay periods.

In at least one example, the array has a size of 100 elements. In examples in which the array has a size of 100 elements and the UPS 100 operates at a sampling frequency of approximately 2 kHz, a fault condition may be detected within 50 ms (that is, the time that would elapse in sampling 100 elements at 2 kHz).

In various examples, each of the SCRs 120 may be associated with dedicated circuitry such that a fault condition of either individual SCR 120a, 120b may be detected, rather than detecting a fault condition of the bypass switch 118 generally. For example, each of the SCRs 120a, 120b may be associated with a dedicated high-pass filter and summation array such that information indicative of a fault condition of one of the SCRs 120a, 120b does not affect a determination of a fault condition of the other of the SCRs 120a, 120b. In executing the process 200 in these examples, the process may include additional acts. For example, after determining the input and output voltages at act 204, the controller 112 may determine which of the SCRs 120a, 120b is forward-biased (that is, which of the SCRs 120a, 120b is subject to a voltage drop from an anode to a cathode thereof). The determination may be based on the input and output voltage measurements at act 204. In subsequently outputting an indication of a fault at act 220, the controller 112 may more particularly output an indication of which of the SCRs 120a, 120b is experiencing the fault.

Although certain examples have been provided with respect to SCRs, it is to be appreciated that the principles of the disclosure are applicable to other devices, such as other types of voltage-controlled switches. Similarly, although certain examples have been provided with respect to UPS systems, it is to be appreciated that the principles of the disclosure are applicable to other systems, such as power systems, in which devices, such as SCRs, may be implemented.

Various controllers, such as the controller 112, may execute various operations discussed above. Using data stored in associated memory, the controller 112 also executes one or more instructions stored on one or more non-transitory computer-readable media that may result in manipulated data. In some examples, the controller 112 may include one or more processors or other types of controllers. In one example, the controller 112 is or includes a commercially available, general-purpose processor. In another example, the controller 112 performs at least a portion of the operations discussed above using an application-specific integrated circuit tailored to perform particular operations in addition to, or in lieu of, a general-purpose processor. As illustrated by these examples, examples in accordance with the present invention may perform the operations described herein using many specific combinations of hardware and software and the invention is not limited to any particular combination of hardware and software components.

In various examples, one or more acts of the process 200 may be optionally executed. For example, one or more of acts 210, 212, 218, and 224 may optionally not be executed in various examples of the process 200. In other examples, each act discussed above with respect to the process 200 is executed.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. An uninterruptible power supply, comprising:
   a first input configured to receive input power;
   a backup input configured to receive backup power from a backup power source;
   an output configured to provide output power to a load derived from at least one of the input power or the backup power;
   a bypass switch having a first connection coupled to the first input and a second connection coupled to the output; and
   a controller coupled to the bypass switch and configured to:
   determine a voltage difference across the bypass switch;
   compare, based on the voltage difference across the bypass switch, input harmonics of a first voltage at the first connection of the bypass switch with output harmonics of a second voltage at the second connection of the bypass switch; and output an indication of a failure of the bypass switch based on the comparing of the input harmonics and the output harmonics.

2. The uninterruptible power supply of claim 1, wherein the controller is further configured to determine whether a value derived from the comparing of the input harmonics and the output harmonics exceeds a threshold.

3. The uninterruptible power supply of claim 2, wherein the controller is further configured to identify the failure of the bypass switch responsive to determining that the value derived from the comparing of the input harmonics and the output harmonics exceeds the threshold.

4. The uninterruptible power supply of claim 1, wherein the controller is further configured to:
   determine a plurality of voltage differences across the bypass switch; and
   determine a plurality of comparisons, each comparison being performed between harmonics at the first connection of the bypass switch and harmonics at the second connection of the bypass switch for each voltage difference of the plurality of voltage differences.

5. The uninterruptible power supply of claim 4, wherein the controller is further configured to identify the failure of the bypass switch based on the plurality of comparisons.

6. The uninterruptible power supply of claim 4, wherein the controller is further configured to identify the failure of the bypass switch based on a sum of the plurality of comparisons.

7. The uninterruptible power supply of claim 1, wherein the bypass switch includes at least one silicon-controlled rectifier.

8. The uninterruptible power supply of claim 1, wherein the bypass switch includes a first silicon-controlled rectifier and a second silicon-controlled rectifier coupled antiparallel to the first silicon-controlled rectifier.

9. The uninterruptible power supply of claim 8, wherein outputting the indication of the failure of the bypass switch includes outputting an indication of a failure of one of the first silicon-controlled rectifier or the second silicon-controlled rectifier.

10. The uninterruptible power supply of claim 1, further comprising an inverter coupled to the first input, the backup input, and the output, wherein the controller is further configured to control the inverter and the bypass switch to change a mode of operation responsive to identifying the failure of the bypass switch.

11. A non-transitory computer-readable medium storing thereon sequences of computer-executable instructions for controlling a power device including a bypass switch having an input connection and an output connection, the sequences of computer-executable instructions including instructions that instruct at least one processor to:
   determine a voltage difference across the bypass switch;
   compare, based on the voltage difference across the bypass switch, input harmonics of a first voltage at the input connection of the bypass switch with output harmonics of a second voltage at the output connection of the bypass switch; and
   output an indication of a failure of the bypass switch based on the comparing of the input harmonics and the output harmonics.

12. The non-transitory computer-readable medium of claim 11, wherein the instructions further instruct the at least one processor to determine whether a value derived from the comparing of the input harmonics and the output harmonics exceeds a threshold.

13. The non-transitory computer-readable medium of claim 12, wherein the instructions further instruct the at least one processor to identify the failure of the bypass switch responsive to determining that the value derived from the comparing of the input harmonics and the output harmonics exceeds the threshold.

14. The non-transitory computer-readable medium of claim 11, wherein the instructions further instruct the at least one processor to:
   determine a plurality of voltage differences across the bypass switch; and
   determine a plurality of comparisons, each comparison being performed between harmonics at the input connection of the bypass switch and harmonics at the output connection of the bypass switch for each voltage difference of the plurality of voltage differences.

15. The non-transitory computer-readable medium of claim 14, wherein the instructions further instruct the at least one processor to identify the failure of the bypass switch based on the plurality of comparisons.

16. The non-transitory computer-readable medium of claim 14, wherein the instructions further instruct the at least one processor to identify the failure of the bypass switch based on a sum of the plurality of comparisons.

17. The non-transitory computer-readable medium of claim 11, wherein the bypass switch includes a first switch and a second switch coupled antiparallel to the first switch, and wherein outputting the indication of the failure of the bypass switch includes outputting an indication of a failure of one of the first switch or the second switch.

18. A power system comprising:
   a first input configured to receive input power;
   a backup input configured to receive backup power from a backup power source;
   an output configured to provide output power to a load derived from at least one of the input power or the backup power;
   a bypass switch having a first connection coupled to the first input and a second connection coupled to the output; and
   a controller coupled to the bypass switch and configured to:
      determine a voltage difference across the bypass switch;
      compare, based on the voltage difference across the bypass switch, input harmonics of a first voltage at the first connection of the bypass switch with output harmonics of a second voltage at the second connection of the bypass switch; and
      output an indication of a failure of the bypass switch based on the comparing of the input harmonics and the output harmonics.

19. The power system of claim 18, wherein the controller is further configured to determine whether a value derived from the comparing of the input harmonics and the output harmonics exceeds a threshold.

20. The power system of claim 19, wherein the controller is further configured to identify the failure of the bypass switch responsive to determining that the value derived from the comparing of the input harmonics and the output harmonics exceeds the threshold.

* * * * *